(12) United States Patent
Tsai et al.

(10) Patent No.: US 10,697,753 B2
(45) Date of Patent: *Jun. 30, 2020

(54) STRAIN SENSING DEVICE AND MANUFACTURING METHOD THEREOF

(71) Applicant: Winbond Electronics Corp., Taichung (TW)

(72) Inventors: Ming-Chih Tsai, Taichung (TW); Yu-Hsuan Ho, Taichung (TW)

(73) Assignee: Winbond Electronics Corp., Taichung (TW)

( * ) Notice: Subject to any disclaimer, the term of this patent is extended or adjusted under 35 U.S.C. 154(b) by 308 days.

This patent is subject to a terminal disclaimer.

(21) Appl. No.: 15/867,745

(22) Filed: Jan. 11, 2018

(65) Prior Publication Data

US 2018/0209775 A1 Jul. 26, 2018

(30) Foreign Application Priority Data

Jan. 26, 2017 (CN) .......................... 2017 1 0061700

(51) Int. Cl.
*G01B 7/00* (2006.01)
*G01B 7/16* (2006.01)

(52) U.S. Cl.
CPC ..................... *G01B 7/18* (2013.01)

(58) Field of Classification Search
CPC ....................................................... G01B 7/18
See application file for complete search history.

(56) References Cited

U.S. PATENT DOCUMENTS

| 4,057,823 A | 11/1977 | Burkhardt et al. |
| 4,738,146 A * | 4/1988 | Baumgartner ............ G01L 1/20 |
| | | 338/114 |
| 5,375,474 A | 12/1994 | Moore, Sr. |
| 5,404,124 A * | 4/1995 | Ruppin .................... G01B 7/20 |
| | | 338/2 |

(Continued)

FOREIGN PATENT DOCUMENTS

| CN | 102403975 | 4/2012 |
| CN | 104220964 | 12/2014 |

(Continued)

OTHER PUBLICATIONS

Article titled "Highly Stretchable Piezoresistive Graphene-Nanocellulose Nanopaper for Strain Sensors" by Yan et al. and published on Dec. 17, 2013.*

(Continued)

*Primary Examiner* — Blake A Tankersley
(74) *Attorney, Agent, or Firm* — JCIPRNET

(57) ABSTRACT

A strain sensing device and a manufacturing method thereof are provided in the invention. The strain sensing device includes a substrate and at least one sensing electrode. The substrate has a plurality of pores. A material of the substrate includes nanocellulose, and the substrates is strained in response to changes in external conditions. The at least one sensing electrode is disposed on the substrate, wherein the sensing electrode contacting the substrate extends into the pores of the substrate. The at least one sensing electrode has a major axis parallel to a surface of the substrate. A resistance value of the at least one sensing electrode changes in response to a strain of the substrate.

13 Claims, 4 Drawing Sheets

(56) References Cited

U.S. PATENT DOCUMENTS 10,401,200 B2 * 9/2019 Tsai ................... G01D 11/00
2016/0187166 A1 6/2016 Ranky et al.

FOREIGN PATENT DOCUMENTS

| CN | 105576099 | 5/2016 |
| CN | 105618739 | 6/2016 |
| CN | 205334403 | 6/2016 |
| CN | 106247920 | 12/2016 |
| TW | 201209667 | 3/2012 |
| TW | M533228 | 12/2016 |

OTHER PUBLICATIONS

"Office Action of China Counterpart Application," dated Oct. 10, 2019, p. 1-p. 8.

* cited by examiner

STRAIN SENSING DEVICE AND MANUFACTURING METHOD THEREOF

CROSS-REFERENCE TO RELATED APPLICATION

This application claims the priority benefit of China application serial no. 201710061700.5, filed on Jan. 26, 2017. The entirety of the above-mentioned patent application is hereby incorporated by reference herein and made a part of this specification.

BACKGROUND OF THE INVENTION

1. Field of the Invention

The invention relates to a sensing device, and particularly relates to a strain sensing device.

2. Description of Related Art

The working principle of a strain sensing device is to measure a strain based on a change of a resistance value of a sensing electrode. Specifically, the resistance value of the sensing electrode is positively proportional to an amount of the strain. Thus, based on the change of the resistance value of the sensing electrode, an amount of strain of the sensing electrode can be obtained. Accordingly, an amount of strain of a substrate below the sensing electrode may also be inferred. However, in the conventional strain sensing device, the adhesion between the substrate and the sensing electrode is less than desirable. Thus, the strain of the sensing electrode is unable to accurately reflect the strain of the substrate.

SUMMARY OF THE INVENTION

The invention provides a strain sensing device and a manufacturing method of the strain sensing device, which are capable of increasing an accuracy of the strain sensing device.

A strain sensing device according to an embodiment includes a substrate and at least one sensing electrode. The substrate has a plurality of pores. A material of the substrate includes nanocellulose, and the substrates is strained in response to changes in external conditions. The at least one sensing electrode is disposed on the substrate, wherein the sensing electrode contacting the substrate extends into the pores of the substrate. The at least one sensing electrode has a major axis parallel to a surface of the substrate. A resistance value of the at least one sensing electrode changes in response to a strain of the substrate.

A manufacturing of a strain sensing device according to an embodiment of the invention includes the following steps. A substrate having a plurality of pores is formed on a carrier. A material of the substrate includes nanocellulose, and the substrates is strained in response to changes in external conditions. The substrate has a plurality of pores. At least one sensing electrode is formed on the substrate. The sensing electrode contacting the substrate extends into the pores of the substrate, and the at least one sensing electrode has a major axis parallel to a surface of the substrate. A resistance value of the at least one sensing electrode changes in response to a strain of the substrate.

Based on the above, since the sensing electrode of the strain sensing device according to the present invention extends into the pores of the substrate, the sensing electrode can be mechanically interlocked with the structure of the substrate. The mechanical interlock is also referred as an anchoring effect. Thus, an adhesion between the sensing electrode and the substrate can be improved. In this way, the change of the resistance value of the sensing electrode can accurately reflect the strain of the substrate, and the accuracy of the strain sensing device is consequently raised.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
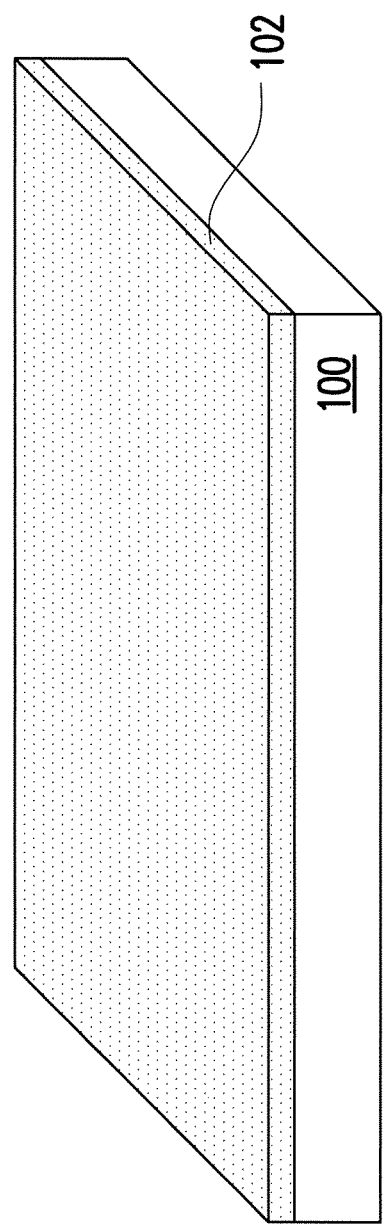
FIGS. 1A to 1C are perspective views illustrating a manufacturing process of a strain sensing device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
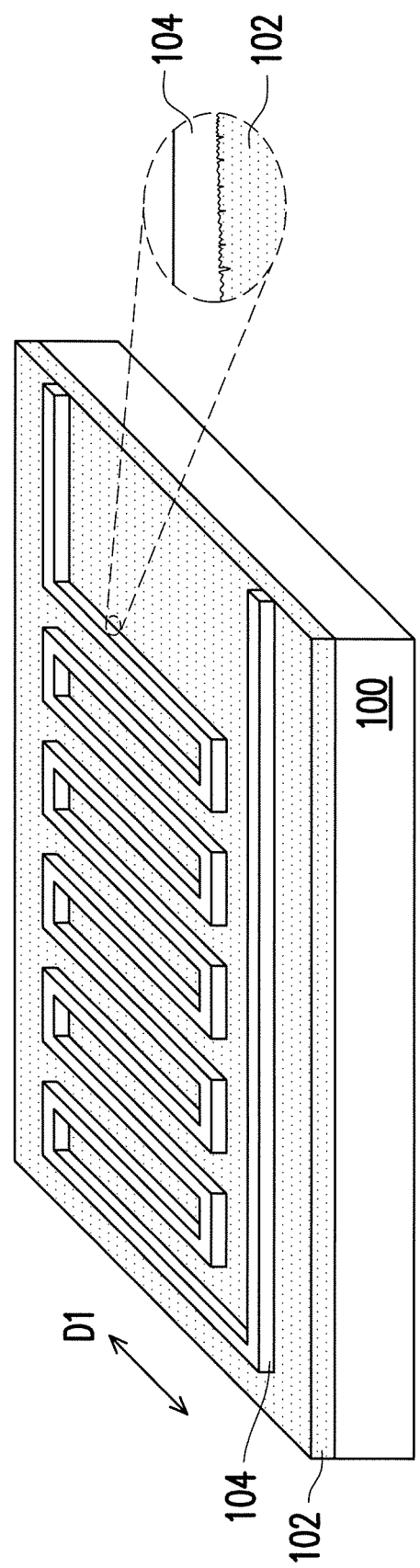
Figure 1C:
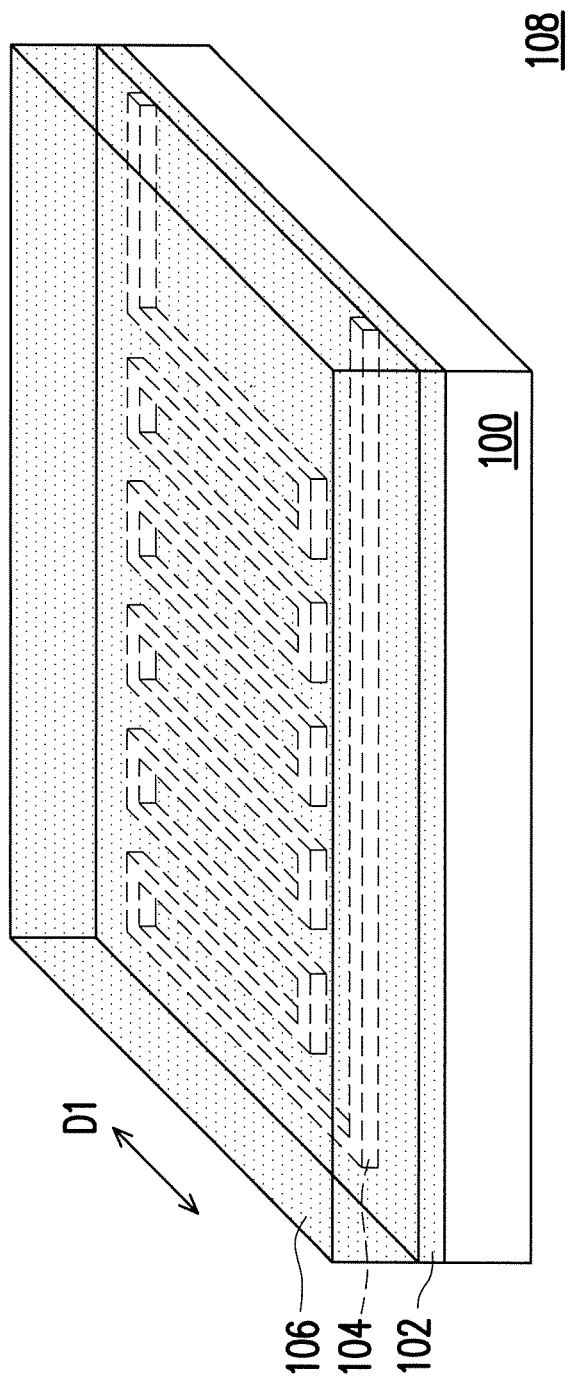

FIGS. 1A to 1C are perspective views illustrating a manufacturing process of a strain sensing device according to an embodiment of the invention.

Referring to FIG. 1A, the manufacturing method of the strain sensing device of the present embodiment includes the following steps. First, a substrate 102 having a plurality of pores are formed on a carrier 100. In an embodiment, a material of the substrate 102 may include nanocellulose. The nanocellulose consists of a plurality of fibers intersecting each other. A plurality of gaps are provided between the fibers to form the pores in the substrate 102. The substrate 102 is strained in response to changes in external conditions, for example, stress applied on the substrate 102, or temperature changes and so on. A method of forming the substrate 102 may include a printing process. In an embodiment, the printing process is, for instance, a three-dimensional printing process. More specifically, the method of forming the substrate 102 may include printing an ink applied for forming the substrate 102 onto the carrier 100, and then performing curing to remove a solvent in the ink to form the substrate 102. In an embodiment, a shape of the carrier 100 may be a plate-like shape as shown in FIG. 1A. However, the invention intends to impose no limitation on the shape or the material of the carrier. People having ordinary skills in the art may choose a suitable carrier based on design requirements.

Referring to FIG. 1B, a sensing electrode 104 is then formed on the substrate 102. A method of forming the sensing electrode 104 may include a printing process. In an embodiment, the printing process may include a three-dimensional printing process. Specifically, the method of forming the sensing electrode 104 may include the following steps. First, an ink applied for forming the sensing electrode 104 is printed onto the substrate 102. The ink can further diffuse into the pores of the substrate 102. Then, a curing process is performed to remove a solvent in the ink to form the sensing electrode 104. Accordingly, the sensing electrode 104 contacts the substrate 102 and extends into the pores of the substrate 102. An enlarged cross-sectional view of the sensing electrode 104 and the substrate 102 is as shown as an area marked with dash lines in FIG. 1B. Thus, the structure of the substrate 102 is mechanically interlocked with the sensing electrode 104. The mechanical interlock is also referred as an anchoring effect. Thus, an adhesion between the sensing electrode 104 and the substrate 102 can be improved. In this way, changes of the resistance value of the sensing electrode 104 can accurately reflect the strain of the substrate 102, and the accuracy of the strain sensing device 108 is consequently raised.

The sensing electrode 104 may be formed into a specific shape, so that the sensing electrode 104 may have a major axis parallel to a surface of the substrate 102. In an embodiment, a shape of the sensing electrode 104 may be a serpentine shape, and an extending direction of the major axis of the sensing electrode 104 is shown as a first direction D1 in FIG. 1B. When the carrier 100 is subjected to a stress that leads to a strain in the first direction D1, a strain of the sensing electrode 104 formed above the carrier 100 in the first direction D1 is also produced. Thereby, a resistance value of the sensing electrode 104 is accordingly altered. In an embodiment, tensile strains are produced on the carrier 100 and the sensing electrode 104 along the first direction D1, such that a length of the sensing electrode 104 in the first direction D1 is increased, thereby the resistance value of the sensing electrode 104 is raised. Alternatively, when the carrier 100 and the sensing electrode 104 are subjected to a stress and compressive strains in the first direction D1 is produced on the carrier 100 and the sensing electrode 104. As a result, the length of the sensing electrode 104 in the first direction D1 is reduced, thereby the resistance value of the sensing electrode 104 is decreased. Thus, by measuring a change of the resistance value of the sensing electrode 104, a strain of the substrate 102 can be inferred. That is, the strain of the carrier 100 can be inferred as well. In an embodiment, the carrier 100 is a machine body of a transportation vehicle or a workpiece used in precise manufacturing. Thus, a strain of the machine body or the workpiece may be monitored by measuring the change of the resistance value of the sensing electrode 104.

In an embodiment, the sensing electrode 104 may be expanded or shrunk in response to a temperature change of the carrier 100 and the substrate 102. In other words, the resistance value of the sensing electrode 104 may be altered with the temperature change of the carrier 100 and the substrate 102. Thus, the sensing electrode 104 may also be capable of sensing changes of temperature.

Referring to FIG. 1C, subsequently, an encapsulation layer 106 may be optionally formed on the sensing electrode 104. So far, a manufacturing of a strain sensing device 108 has been completed. In an embodiment, a material and a forming method of the encapsulation layer 106 may be the same as the material and the forming process of the substrate 102. In other words, the material of the encapsulation layer 106 may include nanocellulose, and the process of forming the encapsulation layer 106 may include a printing process, such as a three-dimensional printing process. Since nanocellulose exhibits a high mechanical strength, the encapsulation layer 106 can protect the sensing electrode 104 therebelow, so as to prevent the sensing electrode from being damaged. Besides, the encapsulation layer 106 can prevent the sensing electrode 104 from reacting with moisture and/or oxygen in the environment that would change the resistance value of the sensing electrode 104. Accordingly, the accuracy and reliability of the strain sensing device 108 can be further improved.

Hereafter, a structure of the strain sensing device 108 according to the invention will be described with reference to FIG. 1C. Referring to FIG. 1C, the strain sensing device includes the substrate 102 and the sensing electrode 104. The substrate 102 has the plurality of pores. In an embodiment, the material of the substrate 102 may include nanocellulose. The substrate 102 is strained in response to changes in external conditions, for example, stress applied on the substrate 102, or temperature changes and so on. The sensing electrode 104 is disposed on the substrate 102. In addition, the sensing electrode 104 contacting the substrate 102 extends into the pores of the substrate 102, and the sensing electrode 104 has the major axis parallel to the surface of the substrate 102. In an embodiment, the shape of the sensing electrode 104 may include a serpentine shape. In an embodiment, the strain sensing device 108 may further include the encapsulation layer 106 covering the sensing electrode 104. Moreover, the material of the encapsulation layer 106 may also include nanocellulose.

Since the sensing electrode 104 extends into the pores of the substrate 102, the sensing electrode 104 may be mechanically interlocked with the structure of the substrate 102. Thus, an adhesion between the sensing electrode 104 and the substrate 102 can be improved. In this way, the change of the resistance value of the sensing electrode 104 can accurately reflect the strain of the substrate 102, and the accuracy of the strain sensing device 108 is consequently raised.

Figure 2:
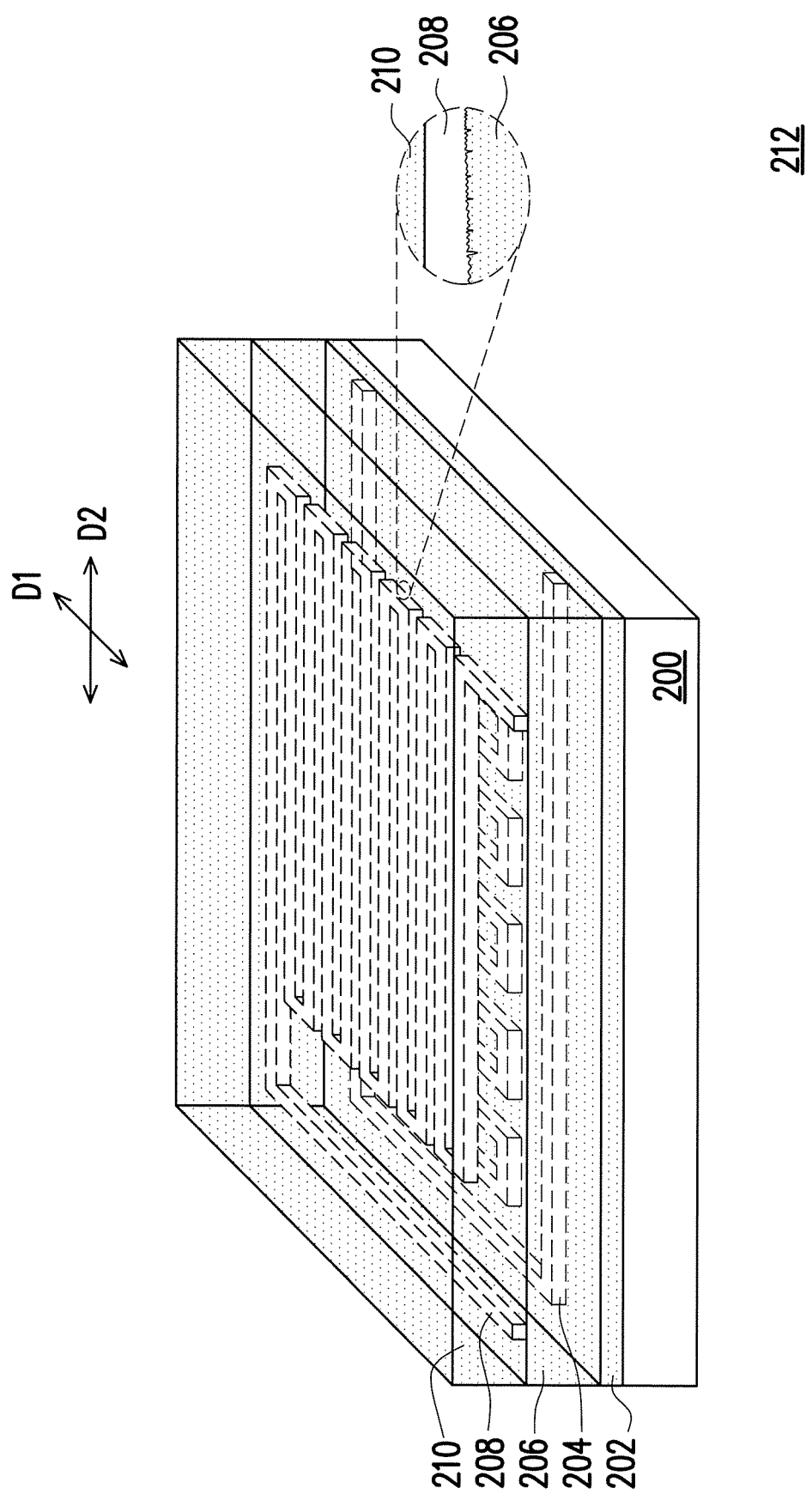
FIG. 2 is a perspective view illustrating a strain sensing device according to another embodiment of the invention.

FIG. 2 is a perspective view illustrating a strain sensing device according to another embodiment of the invention. A strain sensing device 212 shown in FIG. 2 is similar to the strain sensing device 108 as shown in FIG. 1C. Differences between the strain sensing device 212 and the strain sensing device 108 will be described, whereas the similarities therebetween will be omitted.

Referring to FIG. 2, the strain sensing device 212 has two layers of sensing electrodes. Specifically, a sensing electrode 204 and a sensing electrode 208 are stacked on a substrate 202, and the substrate 202 is formed on a carrier 200. The strain sensing device 212 may further include an intermediate layer 206 disposed on the sensing electrode 204 to separate the sensing electrode 204 and sensing electrode 208. The intermediate layer 206 has a plurality of pores, and the sensing electrode 208 contacting the intermediate layer 206 therebelow extends into the pores of the intermediate layer 206.

In an embodiment, a material and a forming process of the intermediate layer 206 may be the same as a material and a forming process of the substrate 202. In other words, the material of the intermediate layer 206 may include nanocellulose, and the method of forming the intermediate layer 206 may include a printing process, such as a three-dimensional printing process. Since the sensing electrode 208 extends into the pores of the intermediate layer 206, the sensing electrode 208 may be mechanically interlocked with the intermediate layer 206 therebelow. Thus, the sensing electrode 208 can be greatly adhered to the intermediate layer 206.

The sensing electrode 204 and the sensing electrode 208 may be formed into a predetermined shape, so that sensing electrode 204 and the sensing electrode 208 may respectively have a major axis parallel to a surface of the substrate 202. In an embodiment, the shapes of the sensing electrode 204 and the sensing electrode 208 may include serpentine shapes and respectively extend along the first direction D1 and a second direction D2 shown in FIG. 2. The second direction D2 intersects with the first direction D1. In an embodiment, the second direction D2 may be perpendicular to the first direction D1. In this way, the strain sensing device 212 is capable of sensing strains in different directions. Also, the sensing electrode 204, the sensing electrode 208 and the intermediate layer 206 therebetween may form a capacitor structure, so as to serve as a pressure sensor. Specifically, when the strain sensing device 212 is subjected to a stress in a normal direction of the surface of the substrate 202, the intermediate layer 206 is compressed, and a thickness of the intermediate layer 206 is reduced. Accordingly, a capacitance value of the capacitor structure is increased. Therefore, by measuring a capacitance value between the sensing electrode 204 and the sensing electrode 208, a pressure applied on the strain sensing device 212 can be inferred.

An encapsulation layer 210 shown in FIG. 2 is similar to the encapsulation layer 106 as shown in FIG. 1C, except a difference that the encapsulation layer 210 is formed on the two layers of sensing electrodes. Similarly, the encapsulation layer 210 may protect the sensing electrode 204 and the sensing electrode 208 therebelow, so as to prevent the sensing electrode 204 and the sensing electrode 208 from reacting with moisture and oxygen in the environment. Accordingly, the reliability of the strain sensing device 212 can be further improved.

In another embodiment, a strain sensing device may include three or more sensing electrodes alternately stacked on a substrate, and extending directions of major axes of adjacent sensing electrodes intersect with each other. In addition, the strain sensing device may further include a plurality of intermediate layers. Each of the intermediate layer has a plurality of pores. Each of the intermediate layers is disposed between two adjacent sensing electrodes, and each of the sensing electrodes contacting each of the intermediate layers therebelow extends into the pores of each of the intermediate layers. Thus, the strain sensing device can sense strains in a plurality of directions.

In view of the foregoing, since the sensing electrode of the strain sensing device of the invention extends into the pores of the substrate, the sensing electrode can be greatly adhered to the substrate. In this way, the change of the resistance value of the sensing electrode may accurately reflect the strain of the substrate, and the accuracy of the strain sensing device is consequently improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A strain sensing device, comprising:
a substrate, having a plurality of pores, wherein a material of the substrate comprises nanocellulose, and the substrate is strained in response to changes in external conditions; and
at least one sensing electrode, disposed on the substrate, wherein the sensing electrode contacting the substrate extends into the pores of the substrate, and the at least one sensing electrode has a major axis parallel to a surface of the substrate,
wherein a resistance value of the at least one sensing electrode changes in response to a strain of the substrate.

2. The strain sensing device as claimed in claim 1, wherein a shape of the at least one sensing electrode comprises a serpentine shape.

3. The strain sensing device as claimed in claim 1, wherein the at least one sensing electrode comprises a plurality of sensing electrodes that are stacked on the substrate, and extending directions of major axes of adjacent sensing electrodes of the sensing electrodes intersect with each other.

4. The strain sensing device as claimed in claim 3, further comprising at least one intermediate layer having a plurality of pores, wherein each of the intermediate layer is disposed between two adjacent sensing electrodes of the sensing electrodes, and each of the sensing electrodes contacting each of the intermediate layer therebelow extends into the pores of each of the intermediate layer.

5. The strain sensing device as claimed in claim 4, wherein a material of the at least one intermediate layer comprise nanocellulose.

6. The strain sensing device as claimed in claim 4, wherein the at least one intermediate layer and the sensing electrodes are formed by a three-dimensional printing process.

7. The strain sensing device as claimed in claim 1, further comprising an encapsulation layer covering an uppermost one of the at least one sensing electrode, wherein a material of the encapsulation layer comprises nanocellulose.

8. The strain sensing device as claimed in claim 1, wherein the substrate and the at least one sensing electrode are formed by a three-dimensional printing process.

9. A manufacturing method of a strain sensing device, comprising:
forming a substrate having a plurality of pores on a carrier, wherein a material of the substrate comprises nanocellulose, and the substrate is configured to be strained in response to changes in external conditions;
forming at least one sensing electrode on the substrate, wherein the sensing electrode contacting the substrate extends into the pores of the substrate, and the at least one sensing electrode has a major axis parallel to a surface of the substrate,
wherein a resistance value of the at least one sensing electrode is configured to change in response to a strain of the substrate.

10. The manufacturing method of the strain sensing device as claimed in claim 9, wherein the process of forming the substrate and the process of forming the at least one sensing electrode comprise a printing process.

11. The manufacturing method of the strain sensing device as claimed in claim 9, wherein the forming of the at least one sensing electrode on the substrate comprises stacking a plurality of sensing electrodes on the substrate, and wherein extending directions of major axes of adjacent sensing electrodes of the sensing electrodes intersect with each other.

12. The manufacturing method of the strain sensing device as claimed in claim 11, further comprising forming at least one intermediate layer having a plurality of pores, wherein each of the intermediate layer is disposed between two adjacent sensing electrodes of the sensing electrodes, each of the sensing electrodes contacting each of the intermediate layer therebelow extends into the pores of each of the intermediate layer, and a process of forming the at least one intermediate layer comprises a printing process.

13. The manufacturing method of the strain sensing device as claimed in claim 9, further comprising forming an encapsulation layer on the at least one sensing electrode after forming the at least one sensing electrode, wherein a process of forming the encapsulation layer comprises a printing process.

* * * * *